United States Patent [19]

Lyon

[11] Patent Number: 5,482,234
[45] Date of Patent: Jan. 9, 1996

[54] CLEAT

[76] Inventor: Robert C. Lyon, "Regina", Ludovic Terrace, Greenhill, Wigan, Lancashire., United Kingdom, WN1 2QZ

[21] Appl. No.: 290,829
[22] PCT Filed: Feb. 15, 1993
[86] PCT No.: PCT/GB93/00319
  § 371 Date: Aug. 15, 1994
  § 102(e) Date: Aug. 15, 1994
[87] PCT Pub. No.: WO93/16312
  PCT Pub. Date: Aug. 19, 1993

[30] Foreign Application Priority Data

Feb. 15, 1992 [GB] United Kingdom ............... 9203242

[51] Int. Cl.$^6$ .................................................... F16L 3/08
[52] U.S. Cl. ........................................ 248/74.5; 248/74.1
[58] Field of Search ............................... 248/58, 59, 62, 248/60, 74.1, 74.5, 74.2, 74.3

[56] References Cited

U.S. PATENT DOCUMENTS

| 429,057 | 5/1890 | Peterson | 248/62 |
| 4,709,889 | 12/1987 | Erickson | 248/74.5 |
| 4,799,444 | 1/1989 | Lisowski | 248/62 X |
| 4,971,272 | 11/1990 | Gudriage | 248/74.5 |

FOREIGN PATENT DOCUMENTS

| 1312586 | 11/1962 | France | 248/74.5 |
| 636463 | 9/1936 | Germany | 248/60 |
| 3045906 | 7/1982 | Germany | 248/60 |

Primary Examiner—J. Franklin Foss
Attorney, Agent, or Firm—Thomas R. Vigil

[57] ABSTRACT

A cleat for fixing an elongate article, such as a cable (1) to a support structure, such as a wall (2), has a flexible strap (3) with rigid end parts (4,5). Each end part (4,5) has a through bore (12,13) and the end parts are clamped to each other and are fixed to the wall, with the strap looped around the cable, by using a clamping bolt or screw (15). One of the end parts (4) has an upwardly extending slot (14) which opens at the top surface and communicates with the side of the bore (13) so that this end part (4) can be moved sideways into and out of engagement with the bolt or screw (15) when the end parts (4,5) are not clamped together, thereby to facilitate mounting and removal of the cleat, as well as clamping of a cable.

10 Claims, 1 Drawing Sheet

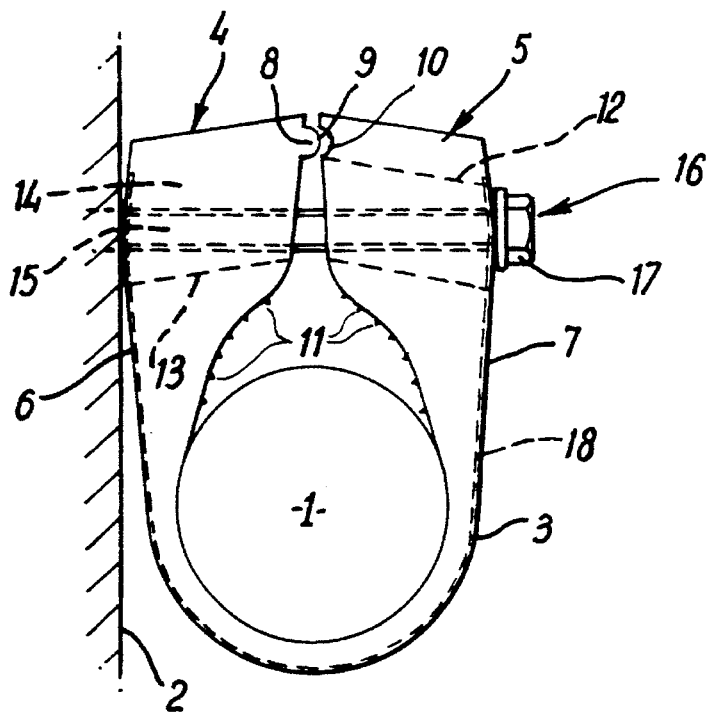
FIG.1
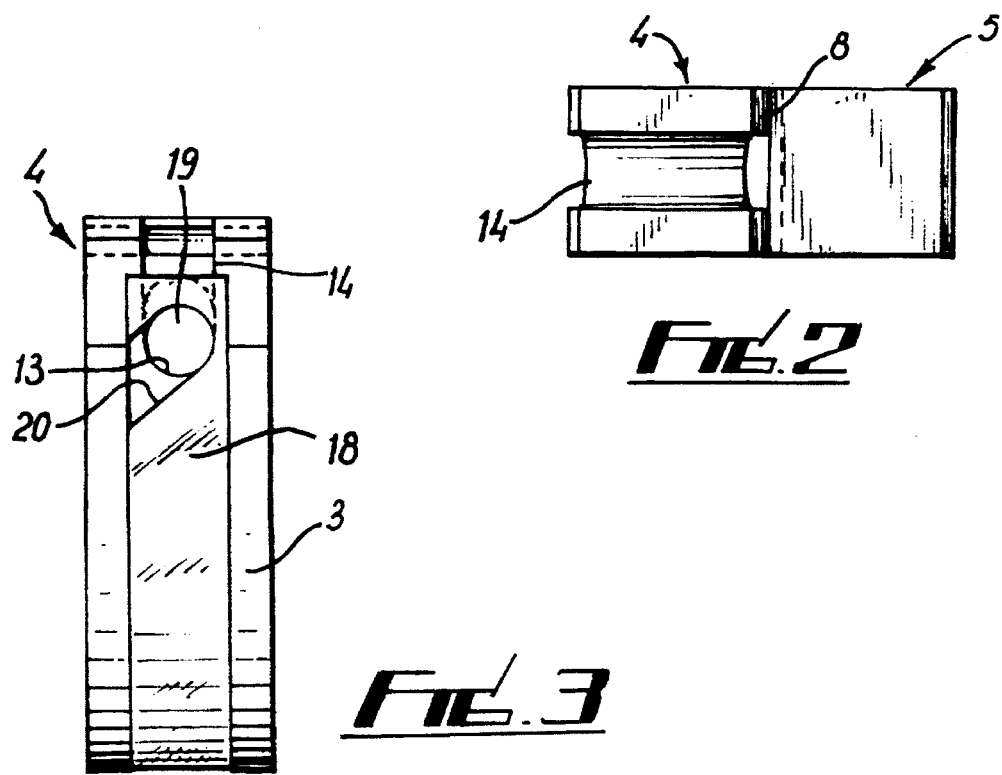
FIG.2
FIG.3

CLEAT

TECHNICAL FIELD

This invention relates to cleats such as are used for securing elongate articles, particularly cables or pipes or the like, to walls or other supporting structures.

Background Art

Prior patent GB 2191812B describes a cleat, for securing a cylindrical object such as a cable, pipe or the like therein, comprising a relatively flexible elongate strap part and a relatively rigid end part at each end of said strap part, clamping means operable to clamp said end parts together in face-to-face disposition, and pivot means disposed between said end parts at that side of said clamping means remote from said strap part whereby in use said end parts are caused to pivot relative to each other about an axis substantially parallel with the axis of said cylindrical object secured in said cleat as said clamping means is tightened, said end parts having a combined thickness when in contact with each other which is greater than the outside diameter of a loop formed by said strap part.

As specifically described in the above patent by way of example, the end parts of the cleat have through bores and the end parts are fixed to a wall and are clamped together around a cable by means of a bolt passed through the bores and engaged with a nut at its outer end.

With this known arrangement, the bolt is fixed to the wall, the cleat already looped around the cable is mounted on the bolt, and then the nut is fitted and tightened. There is therefore the problem that installation of the cable can be complicated, inconvenient and time consuming.

An object of the present invention is to overcome or at least minimize this problem.

Disclosure of the Invention

According to the invention therefore there is provided a cleat, for securing an elongate article (1) to a support structure (2), comprising a flexible strap (3) with a respective rigid end part (4, 5) at each end thereof, each said end part having therein a through bore (12, 13), an elongate clamping element (15) arranged to be fixed at one end to the support structure (2) and to be passed through the bores (12, 13) in the end parts (4, 5) with the strap (3) looped around the elongate article (1), and a clamping member (17) at the other end of the clamping element (15) to clamp the end parts (4, 5) against each other, characterized by the provision of a slot (14) through one end part (4) in communication with the side of the respective bore (13) whereby such end part (4) can be moved sideways into and out of engagement with the clamping element (15) by displacement of the clamping element (15) relative to the end part (4) through the slot (14).

With this arrangement it is possible to mount the cleat and clamping element with the cleat open. A cable or other elongate article can then be installed with such an open cleat by inserting the article into position and then pushing the slotted end part onto the clamping element and tightening the clamping member. It is not necessary to install the clamping element, cleat and article together in a single operation. Also, removal of the article as desired can be readily achieved by releasing the clamping member and pulling off the slotted end part.

The strap and end parts may be formed integrally in one piece as a plastic molding.

The clamping element may be a threaded bolt and the clamping member may be a nut as with the above mentioned known arrangement. However, preferably the element is a bolt or screw and the clamping member is the head of the bolt or screw. This is particularly advantageous because there is only one part to manipulate (which can be effected by unskilled personnel) and the bolt or screw when fitted may have its head close to the outer side of the cleat rather than having an inconvenient (and possibly dangerous) projecting threaded end.

Preferably, the bore in one of the end parts, which does not have the said slot, is elongated sideways so that the position of this end part relative to the clamping element can be adjusted.

By using cooperable configurations on the inner faces of the end parts which mate or interlock when the end parts are clamped together it is possible to ensure that the end parts can be held securely together against transverse separation i.e. such that they cannot be readily pulled apart in a direction transverse to the direction of clamping.

In a particularly preferred embodiment the end parts have cooperable configurations on their inner faces which define a pivot so that the end parts can turn relative to each other as the clamping member is tightened to allow the flexible strap to curve smoothly around the elongate article. Thus, the cleat may have the features of the cleat of the above mentioned prior patent. Also, as described in the above mentioned patent, the end parts may have convex outer faces or similar structures to facilitate rocking or turning during tightening, and the inner surface of the strap may be ribbed or otherwise formed to facilitate gripping of the elongate article.

It is however to be understood that the invention is not restricted to use in the context of the cleat of the prior patent and it may be used on any other suitable kind of cleat structure.

Especially, in the case where the cleat is formed from a heat- or fire-destructible material, as a safeguard a flexible metal strip may be provided on the outside of the strap and end parts, such strip having holes to allow passage of the clamping element and at least one hole communicating with a side slot so that the strip can be removed sideways from the clamping element through such slot at the same end as the said slotted end part. The strap may be recessed to receive the metal strip.

BRIEF DESCRIPTION OF THE DRAWINGS

The invention will now be described further by way of example only and with reference to the accompanying drawings in which:

FIG. 1 is a diagrammatic side view of one form of a cleat, mounted around a cable, in accordance with the invention;

FIG. 2 is a top view of the cleat of FIG. 1; and

FIG. 3 is an end view of part of the cleat showing a fitted metal strip.

BEST MODE OF CARRYING OUT THE INVENTION

Referring to the drawings, a generally cylindrical cable 1 is attached to an upright building wall 2 by means of a cleat.

The cleat comprises a one-piece plastic molding providing a strap part 3 and two enlarged end parts 4, 5. The strap part 3 is thin and relatively flexible so that it can be adjusted between straight and circular, looped conformations. The end parts 4, 5 are relatively rigid.

Each end part 4, 5 has a convex outer face 6, 7. One end part 4 has an integral rod structure 8 of circular cross-section which provides a cylindrical surface 9 on the inner face of such part 4. The other end part 5 has, on its inner face, a complementary channel 10 of part-cylindrical cross-section. The inner surface of the strap part 3 is provided with transverse ribs 11.

The end part 5 has therein a through bore 12 which is elongated in cross-section towards the top of the end part 5 so as to be generally oval in cross-section. The other end part 4 is similarly provided with a through bore 13 but this communicates with a slot 14 from the top of this end part 4. This bore 13 is therefore elongated or extended upwardly sideways (transversely to the bore axis) so as to be open, at its side, at the top of the end part 4.

The cleat is fixed to the wall 2 by means of a bolt 15 which has one end firmly secured to the wall 2. The bolt 15 projects perpendicularly away from the wall 2 and has a head 17 at its other end 16.

The bolt 15 is passed through the bores 12, 13 in the end parts 4, 5 with the strap part 3 looped around the cable 1, and the end parts 4, 5 are clamped together by turning the bolt 15 to screw it into the wall so as to clamp the head 17 against the end part 5. As the bolt 15 is tightened the cylindrical surface 9 engages the channel 10 and the end parts 4, 5 pivot relative to each other to ensure smooth looping of the strap part 3 around the cable 1.

Also, the surface 9 and the channel 10 mate or interlock to hold the end parts 4, 5 securely together so that they cannot readily be pulled apart in a direction transverse to the bolt 15 and to the article 1.

Installation of the cable can be achieved by first passing the bolt 15 through the bore 12 and then screwing the bolt into the wall with the strap part 3 hanging down and the cleat open. The strap part 3 is then looped around the cable 1, the end part 4 is pushed onto the bolt 15 using the slot 14, and the bolt 15 is then tightened.

If it is desired to release the cable 1, this can be done by loosening the bolt 15 so that the end parts 4,5 are spaced from each other and then pulling down the end part 4 so that it disengages from the bolt 15 through the slot 14.

With this arrangement, a cable can be installed in a particularly simple, convenient, and quick manner. There is no need to install the bolt 15, the cleat and the cable 1 together.

As a safeguard against total loss of cable support during a fire, a thin flexible metal strip 18 may be fitted around the outer surface of the cleat. The strip 18 has a hole in one end which fits on the bolt 15 under the head 17. At its other end the strip 18 has a hole 19 with a side slot 20 as shown in FIG. 3. This slotted hole 19, 20 allows the strip 18 to fit on the bolt 15 between the cleat and the wall 2 but permits sideways removal (and replacement) of the strip 18 when the bolt 15 is released so that the end part 4 can be pulled off, and pushed on as described above.

It is of course to be understood that the invention is not intended to be restricted to the details of the above embodiment which are described by way of example only. Thus, for example, instead of the bolt 15, a wood screw or self tapping screw or the like may be used.

I claim:

1. A cleat for securing an elongate article (1) to a support structure (2), comprising:

a flexible strap (3);

a respective rigid end part (4,5) at each end of said strap, each said end part having a bottom region connected to said strap (3), a top surface opposite said bottom region, and a through bore (12, 13) between said regions;

an elongate clamping element (15) arranged to be fixed at one end to the support structure (2) and to be passed through the bores (12, 13) in the end parts (4,5) with the strap (3) looped around the elongate article (1);

a clamping member (17) at the other end of the clamping element (15) to clamp the end parts (4,5) against each other; one only of the end parts (4) having a slot therethrough in communication with the side of the respective bore (13), said slot (14) extending upwardly to open at said top surface;

whereby such end part (4) can be moved sideways into and out of engagement with the clamping element (15) by displacement of the clamping element (15) relative to the end part (4) through the slot (14) whilst the other end part (5) is retained on the clamping element (15) by engagement thereof with the respective bore (12).

2. A cleat according to claim 1 wherein the strap (3) and end parts (4,5) are formed integrally in one piece as a plastic molding.

3. A cleat according to claim 1 wherein the clamping element (15) is a bolt or screw with a head thereto, the clamping member (17) being provided by said head.

4. A cleat according to claim 1 wherein one of the end parts (4) has said slot (14) therethrough and the other of the end parts (5) has said bore (12) thereof elongated sideways.

5. A cleat according to claim 1 wherein the end parts (4,5) include inner faces with co-operable configurations (9,10) on said inner faces which interlock when said end parts (4,5) are clamped together.

6. A cleat according to claim 5 wherein the co-operable configurations (9,10) define a pivot.

7. A cleat according to claim 1 wherein the end parts (4,5) include convex outer faces (6,7).

8. A cleat according to claim 1 wherein the inner surface of the strap is ribbed (11).

9. A cleat according to claim 1 wherein a flexible metal strip (18) is provided on the outside of the strap (3) and end parts (4,5), said strip (18) including holes (19) to allow passage of the clamping element (15) and at least one hole (19) communicating with a side slot (20).

10. A cleat according to claim 9 wherein the strap (3) is recessed to receive the metal strip (18).

* * * * *